J. D. BASCOM.
TOW LINE.
APPLICATION FILED MAR. 26, 1914.
1,149,807.
Patented Aug. 10, 1915.
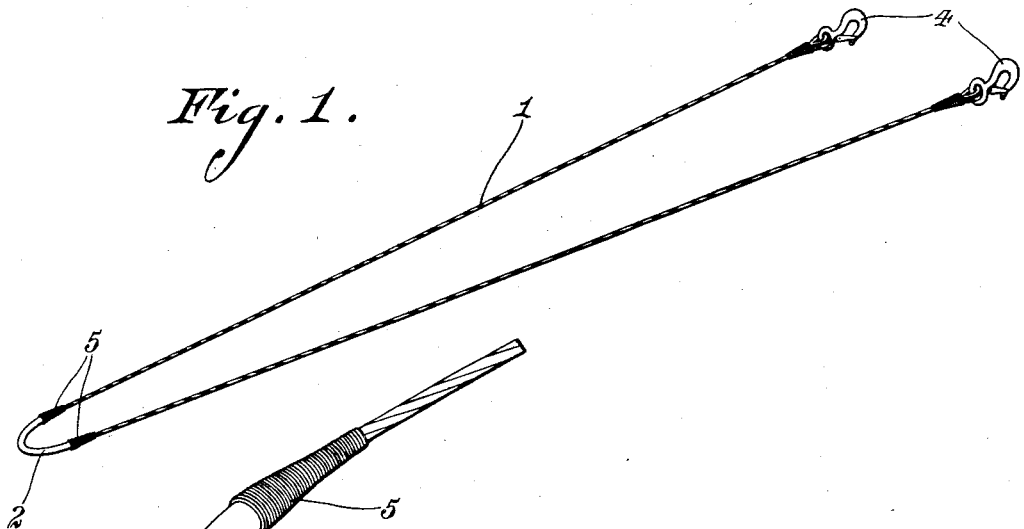
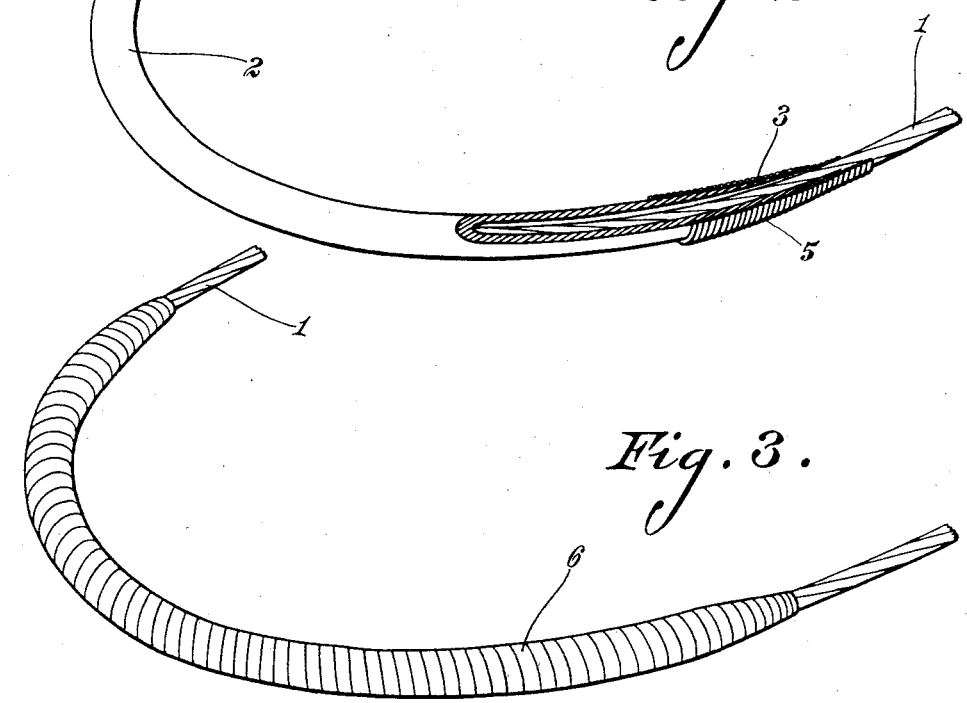
Witnesses:
Inventor:
JOSEPH D. BASCOM,
By Hugh K. Wagner,
His Attorney.

UNITED STATES PATENT OFFICE.

JOSEPH D. BASCOM, OF ST. LOUIS, MISSOURI.

TOW-LINE.

1,149,807.      Specification of Letters Patent.      Patented Aug. 10, 1915.

Application filed March 26, 1914. Serial No. 827,514.

*To all whom it may concern:*

Be it known that I, JOSEPH D. BASCOM, a citizen of the United States, residing at the city of St. Louis, State of Missouri, have invented certain new and useful Improvements in Tow-Lines, of which the following is a specification.

This invention relates to improvements in tow-lines such as the tow-line disclosed in my invention, United States Patent No. 1,009,633, granted November 21, 1911, and has for its object to provide a flexible protecting cover of cheap and simple construction and of neat appearance for the middle or any other portion of same.

Under certain conditions it has been found that a tow-line, such as that of my invention above referred to, may not be of sufficient strength, when used as a single line, for the work required of it. For instance, should an automobile become stalled in very deep mire, or be stalled with an extra heavy load, or in a position where great strain for pulling it out of a stalled position is required, or if for any other reason a tow-line of greater strength than that provided by a line such as that of my invention above referred to used as a single line is required, the tow-line embodying the present invention can be doubled and worked to substantially double the breaking strain of the single line without injury thereto. In such a case, a tow-line equipped with the flexible protecting cover of this invention protecting a portion of the wire-rope line substantially mid-way between its ends may be looped through the sling upon the anchorage or may be looped around said anchorage at the protected portion, and the two draft hooks may be hooked into the sling upon the automobile, thus providing a double towing line of substantially half the length of the full length of the single line and of substantially double the strength of the single line. The flexible protecting cover causes the protected portion looped through said sling upon said anchorage or about said anchorage to bend in an arc of greater radius than such a portion so looped without the protection provided by this invention, and said protecting cover and increased arc produced thereby prevent the wire-rope line from kinking at the loop, distributing the strains uniformly upon the strands of the line at said loop, and, also, protecting the strands at the inner side of said loop from abrasion against the anchorage, or, in case the tow-line is looped through the usual hemp or cotton rope sling, said protecting cover prevents the loop of the wire-rope from cutting or abrading the strands of said hemp or cotton rope sling. Moreover, the anchorage available for use in connection with a tow-line, may be so near to a stalled or mired automobile, or the like, that the full length of the tow-line is too great, in which case a tow-line equipped with the protecting cover of this invention may be looped through a rope sling upon said anchorage or looped about said anchorage at the protected portion of said line and the two draft hooks at the ends of the line be both hooked into the sling about a part of the stalled automobile or the like, thus providing an efficient line of substantially half the length of the single line without damaging said line at the loop and without damaging the sling through which the loop is formed, and, generally, protecting said looped portion or the sling through which the loop is formed from unusual wear.

Instead of looping the line at the anchorage end and attaching the hook ends to the loop upon the stalled or mired automobile or the like, the loop may be formed through a sling upon the stalled automobile or the like and the hooks at the ends attached to the sling upon the anchorage, or the line may be looped at the protected portion directly about a part of the stalled machine without the use of the sling, and, because of the protecting covering provided by this invention, damage to painted parts of said automobile at said loop as well as damage to the wire strands of the loop will be prevented. Similarly in case one automobile is towing or pulling another by means of a double tow-line, the loop formed at the protected portion of said line may be formed directly upon a part of either automobile without damage to the line at the looped portion or to parts of the automobile upon which the loop is formed.

The protecting cover of this invention does not add materially to the bulk of a tow-line, and a tow-line equipped with same may readily be made up into the compact package of great convenience and neatness disclosed in my above-mentioned patent.

In using a tow-line, it often becomes besmeared with mud and oil, but in the case of a line equipped with the protecting cover of this invention, the oil and dirt may be readily removed from said protecting cover, thus providing a convenient grasping means whereby to grasp the line without soiling the hands. Moreover, in cold weather the ordinary wire-rope tow-line becomes very cold which makes it disagreeable to handle and causes the hands of one carrying or handling it to become benumbed with cold, but in a line equipped with the protecting cover of this invention a convenient grasping means is provided so that the line can be handled at the protected portion without touching the cold metal of the wire rope.

In the accompanying drawings, forming part of this specification, in which like numbers of reference denote like parts wherever they occur, Figure 1 is a perspective view of a tow-line with the protecting cover thereon; Fig. 2 is a perspective view, on an enlarged scale, of a portion of a tow-line with the protecting cover thereon shown partly in section; and Fig. 3 is a perspective view of a portion of a tow-line, showing an alternate form of the protecting cover.

Upon the tow-line 1, which is preferably formed of wire, having both ends 3 thereof preferably tapered, as best seen in Fig. 2, a flexible tube 2, such, for instance, as a piece of rubber hose or the like is slipped upon said line by passing an end of said line through the said tube before a draft hook 4 has been attached to said end, and said tube is then advanced along said tow-line to a position midway between the hook-bearing ends of the tow-line, as shown in Fig. 1, and the tapered ends of said tube are secured to said tow-line by seizing 5, or other suitable means. If desired, the tube 2 may be omitted entirely and adhesive tape 6, Fig. 3, or any other suitable material may be substituted in lieu thereof. In case adhesive tape is used same is wrapped about the middle portion of the tow-line in such a manner that there is a greater number of laps made to form the middle portion of the cover than the end portions thereof, the latter being tapered.

It should be understood that instead of fastening the cover securely in place upon the tow-line in the manner hereinabove described, same may be slidably fitted thereon so as to permit of its adjustment along the length of the tow-line. Furthermore, the cover may be located elsewhere upon the tow-line than the middle portion thereof, or, if desired, two or more such covers may be employed and located upon any portions of the tow-line.

I claim:

1. The combination, with a wire rope tow line, of means on said rope intermediate its ends to prevent an abrupt bend in said rope at the point of contact of the rope with a load, whereby the strains are uniformly distributed upon the strands of the rope; said means consisting of a flexible tubular covering of substantial thickness surrounding the central portion of the rope, and means securing the ends of the covering rigidly to the said rope against movement.

2. The combination, with a wire tow-line, of means on said rope intermediate its ends to prevent an abrupt bend in said rope at the point of contact of the rope with a load, whereby the strains are uniformly distributed upon the strands of the rope, said means consisting of a flexible tubular covering of substantial thickness surrounding the central portion of the rope and having tapered ends, and means securing the tapered ends to said rope whereby the covering is held against axial movement on the rope.

In testimony whereof I hereunto affix my signature in the presence of two witnesses.

JOSEPH D. BASCOM.

Witnesses:
   WALTER C. GUELS,
   NANCY C. THOMAS.